United States Patent [19]

Andrews et al.

[11] Patent Number: 4,607,900

[45] Date of Patent: Aug. 26, 1986

[54] TELEPHONE JACK SECURITY DEVICES

[76] Inventors: Joe Andrews; Dolores Andrews, both of 7407 Hobart Blvd., Los Angeles, Calif. 90047; Beverly Lockett, 1357 Geddes St., Los Angeles, Calif. 90044

[21] Appl. No.: 607,434

[22] Filed: May 7, 1984

[51] Int. Cl.$^4$ ............................................. H01R 13/44
[52] U.S. Cl. .................... 339/37; 179/189 R; 200/43.22; 339/44 R
[58] Field of Search .................. 339/37, 44 R, 82; 200/44, 43.22; 179/189 R

[56] References Cited

U.S. PATENT DOCUMENTS

| 1,801,228 | 4/1931 | Edhlund | 200/43.22 |
| 3,140,344 | 7/1964 | Slater et al. | 339/44 R |
| 4,162,516 | 7/1979 | Becker | 339/198 M |

Primary Examiner—Gil Weidenfeld
Assistant Examiner—Paula Austin
Attorney, Agent, or Firm—Herzig & Yanny

[57] ABSTRACT

A telephone access jack security device for an access jack mounted in a faceplate of a fixture. The security device comprises a baseplate adapted to mount on the front of the faceplate having an opening therein adapted to expose the connector receptacle. A locking member is attached to the baseplate and extends outwardly therefrom. A coverplate, of substantially unitary contruction, having suitable dimensions to substantially cover the baseplate, is placed in parallel overlying relationship therewith, forming a cavity between the baseplate and the coverplate sufficiently sealed to prevent passage of a telephone connector. The coverplate has an opening therein sufficient to permit the close passage of the locking member therethrough when the coverplate and the baseplate are placed in the parallel overlying relationship with one another. The coverplate and baseplate are hinged together to permit the coverplate to be placed in this substantially parallel overlying relationship with the baseplate. The hinge connection points of the coverplate and the baseplate are substantially within the cavity formed between the coverplate and the baseplate to effectively preclude tampering therewith.

3 Claims, 5 Drawing Figures

TELEPHONE JACK SECURITY DEVICES

BACKGROUND OF THE INVENTION

1. Technical Field

The present invention relates generally to a manner of preventing the unauthorized use of a telephone line and, more particularly, to a system of preventing the connection of a telephonic device to a telephone line access jack.

2. Description of the Prior Art

The unauthorized connection of telephones to access jacks and the resulting unauthorized use thereof represents a sizable and costly problem to the party responsible for paying the access and time of connection charges. Therefore, there is a need to secure the access jack in a manner that is not easily circumvented, and, further, will discourage attempts to defeat the security system so as to optimally protect the physical integrity of the access jack. However, there is a simultaneous need to allow an authorized user to quickly and easily bypass the security system as needed to permit the proper connection of a telephone. Also, the security system should be completely removable and attachable in such a manner that does not damage the access jack, since the jack and surrounding components are not typically owned, but rather rented or leased by the responsible party.

Telephone access jack security systems of the prior art fail to provide the necessary degree of security in an economical and effective manner. Prior art systems are typified by a complex apparatus of necessarily precision made parts. Further, prior art systems typically require permanent or near permanent attachment to the jack fixture in order to secure jack access. Still others make use of the electrical receptacle of the jack, thereby substantially increasing the possibility of damage to the jack by an unauthorized user attempting to defeat the security system. Finally, prior art devices typically leave exposed a wide variety of attachment and hinge points that are vulnerable to the concerted efforts of an unauthorized user attempting to defeat the security system.

SUMMARY OF THE INVENTION

Therefore, a purpose of the present invention is to provide a simple, yet effective access jack security system while overcoming most, if not all of the deficiencies of the prior art systems.

This is accomplished in the present invention by providing a telephone access jack security device for limiting the capability of connecting a telephonic device to an access jack, wherein the access jack is mounted in a fixture having an electrical connector receptacle, a faceplate or the like including means for attaching the faceplate to the fixture, the security device comprising a baseplate adapted to mount on the front of the faceplate and including an opening therein so as to otherwise expose the connector receptacle, a locking member attached to the baseplate and extending outwardly therefrom, a coverplate of substantially unitary construction and of suitable dimensions to substantially cover the baseplate when placed in a parallel, overlying relationship therewith, the coverplate having sides so as to permit the formation of a cavity between the baseplate and the coverplate when placed in a parallel, overlying relationship sufficiently sealed to prevent passage of a connector suitable for insertion into the connector receptacle, the coverplate having a opening therein sufficient to permit the close passage of the locking member therethrough when the coverplate and the baseplate are placed in a parallel, overlying relationship with one another, and means for hingingly attaching the coverplate to the baseplate so as to permit the coverplate to be placed in a substantially parallel, overlying relationship with the baseplate, the connection points of the hinge means to the coverplate and the baseplate being such as to be substantially within the cavity formed between the coverplate and the baseplate so as to effectively preclude tampering therewith.

Thus, an advantage of the present invention is that it provides reliable security against the unauthorized use of a telephone access jack.

Another advantage of the present invention is that it is of a simple and economical construction.

A further advantage of the present invention is that it is adaptable to the wide variety of telephone access fixtures allowing expedient attachment, bypass, and subsequent removal by an authorized user and responsible party.

Still another advantage of the present invention is that, by its operation, it discourages unauthorized attempts to utilize the telephone jack and, thereby preserves the integrity of the fixture and electrical receptacle.

Yet another advantage of the present invention is that it does not utilize the electrical receptacle as an attachment point and, thereby, does not compromise the integrity of the electrical receptacle.

BRIEF DESCRIPTION OF THE DRAWINGS

Other attendant features and further advantages of the present invention will become apparent and readily understood by reference to the following Detailed Description of the Invention when considered in conjunction with the accompanying Drawing, wherein like reference numbers indicate like parts throughout the figures, and wherein.

DETAILED DESCRIPTION OF THE INVENTION

Figure 1:
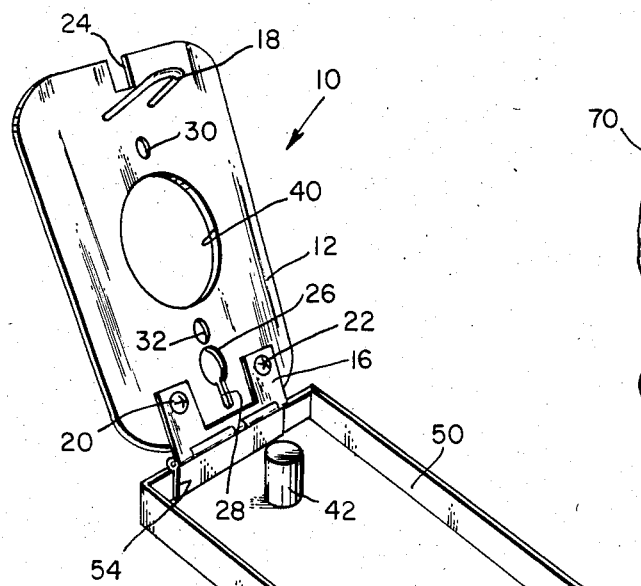
FIG. 1 is a perspective view of a first preferred embodiment of the present invention.

Referring now to the drawings, a first preferred embodiment 10 of the present invention is shown in FIG. 1. The security device 10 primarily comprises a baseplate 12, a coverplate 14, a hinge 16, and a lock loop 18. The baseplate 12 and the coverplate 14 are preferably each of a unitary construction from a sheet metal such as aluminum. The baseplate 12 is punched or otherwise suitably machined to provide a connector receptacle exposure opening 40 therein. Faceplate matching screw-holes 30, 32 alone, together with, or, in the alternative, a slot 24 and key-hole/slot 26, 28 are similarly provided. A lock loop 18 is suitably attached, such as by welding, to the baseplate 12 so as to extend outwardly therefrom. The coverplate 14 is generally of dimensions suitable to cover the baseplate 12 and includes side sections 50, 52, 54 preferably formed by bending the otherwise existing margin portions of the coverplate 14. The hinge 16 is connected by screws 20, 22 to the baseplate 12 and either welded (as shown) or similarly connected by screws to the coverplate 14. This allows the coverplate 14 to be opened away from the baseplate 12 as shown or closed so as to overlie the baseplate 12 and thereby form a substantially sealed cavity thereinbetween. The lock loop 18 is preferably attached to the baseplate 12 at a point opposite the hinge 16, substantially as shown in FIG. 1. An opening 60 is approximately machined or punched in the coverplate 14 so as to permit the close passage of the lock loop 18 therethrough as the coverplate 14 is closed on the baseplate 12. Once closed, the lock loop 18 affords a convenient attachment point for any desired locking device such as a seal wire or a common lock. Since the exposed portion of the lock loop is an obvious point to attack a device constructed in accordance with the present invention, the lock loop 18 may preferably be formed from a case hardened steel. Finally, a locking shaft 42 is optionally provided attached to the inside surface of the coverplate 12. It is positioned so as to extend into and closely fill the correspondingly optional key-hole opening 26 in the baseplate 12 when the coverplate 14 is placed in its closed position.

Figure 2:
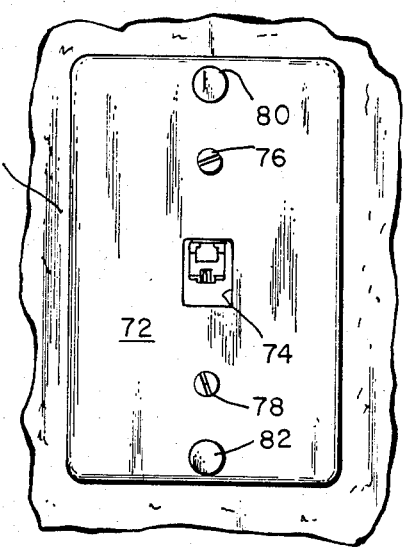
FIG. 2 is a front view of a telephone jack fixture to which the embodiment of FIG. 1 is optimally suited for attachment.

Referring now to FIG. 2, the screw-holes 30, 32, slot 24, and key-hole 26, 28 are provided so as to permit mating of the baseplate 12 to a standard telephone access jack fixture 70. As shown, such a fixture 70 includes a faceplate 72, connector receptacle 74, faceplate attachment screws 76, 78, and, typically, telephone device mounting studs 80, 82.

Figure 3:
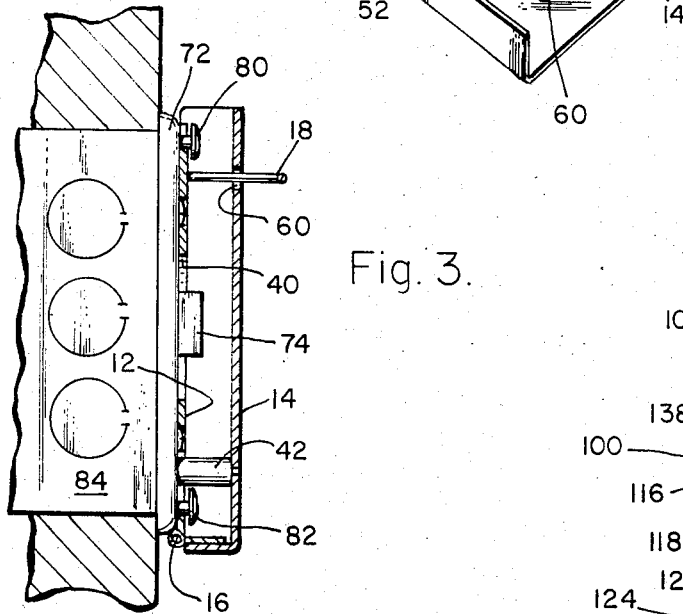
FIG. 3 is a cross-sectional view of the embodiment of FIG. 1 attached to and security the telephone jack of the fixture of FIG. 2.

In FIG. 3, the preferred embodiment of the present invention as shown in FIG. 1 is shown mated to and securing access to the telephone jack connector receptacle 74 of FIG. 2. In cross-section, the faceplate 72 is attached to a fixture box 84. The baseplate 12 of the security device 10 is mated to the faceplate 74 by engaging the studs 80, 82 thereof with the slot 24 and key-slot 28. Engagement is preferably obtained by positioning the slot 24 below the stud 80 and allowing the stud 82 to extend through the key-hole 26 and then sliding the baseplate 12 upward to engage the studs 80, 82 with their respective slots 24, 26. Naturally, the receptacle opening 40 should be of sufficient size to permit any necessary extension of the connector receptacle into the cavity formed between the base- and coverplates 12, 14 and, further, sufficiently large to permit the sliding engagement of the studs 80, 82. Once the studs 80, 82 are engaged, retention of the mated position of the face- and baseplates 74, 12 is obtained by placing the coverplate in its closed position and securing it there by attaching a locking device to the lock loop 18. The locking shaft 42 is, thereby, inserted into and closely fills the key-hole opening 26 so as to prevent the baseplate 12 from sliding downward and out of engagement with the studs 80, 82 of the faceplate 74. Consequently, this embodiment of the present invention can be securely attached to prevent use of a telephone access jack, yet easily opened and removed by an authorized party.

Figure 4:
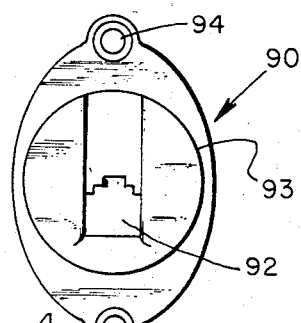
FIG. 4 is a detail front view of a telephone jack fixture to which the embodiment of FIG. 1 may be attached.

A detail of a connector receptacle 90 of another common type of telephone access jack fixture is shown in FIG. 4. The receptacle 92 is provided in a body 93 having faceplate screw attachment points 94, 96. These attachment points 94, 96 are standardly provided at a spacing corresponding to the placement of the screws 76, 78 with regard to the faceplate 72 of FIG. 2. Thus, the screw holes 30, 32 are appropriately positioned to allow the combined mating of the baseplate 12, an appropriate faceplate, and the receptacle body 93 through the use of the screws 76, 78. This results in a relatively more permanent installation of the security device 10. However, access to the connector receptacle remains readily obtainable by releasing the locking device and opening away the coverplate 14. Naturally, this relatively more permanent manner of attachment may also be utilized in addition to the use of studs 80, 82.

Figure 5:
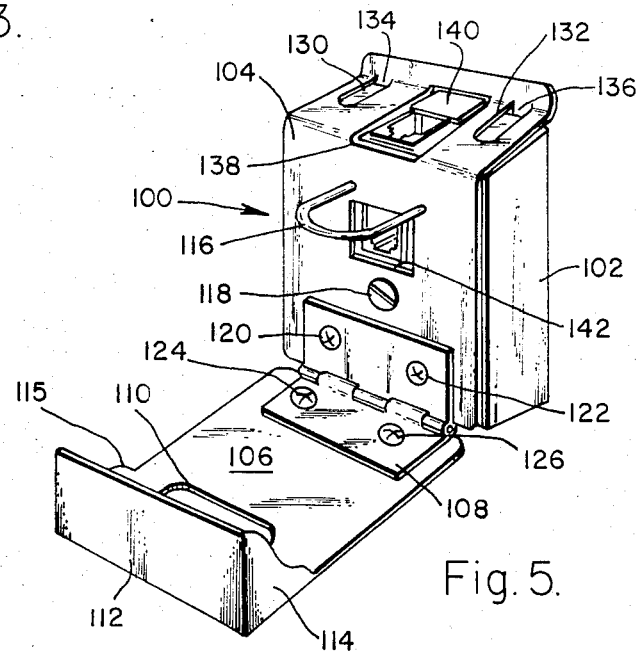
FIG. 5 is a perspective view of a second embodiment of the present invention which is adapted to secure another type of telephone jack fixture.

Another preferred embodiment of the present invention is shown in FIG. 5. The security device 100 is provided to secure the standard external box type telephone jack fixtures 102. The device 100 includes a baseplate 104, coverplate 106, hinge 108, and lock loop 116. The baseplate 104 is formed substantially as shown to cover both side and top positioned connector receptacles and, further, punched or appropriately machined to provide top and side connector receptacle exposure openings 140, 142. Attachment of the baseplate 104 to the fixture 102 is accomplished by providing fingers 134, 136, preferably punched from the baseplate 130, 132, that extend under the edge of the fixture 102. A screw hole is also provided in the baseplate 104 and located over the center top point of the fixture where a screw attachment point is standardly provided. Thus, the screw 118 is utilized for its pre-existing function as well as to securely mate the baseplate 104 to the fixture 102 in combination with the fingers 134, 136.

The coverplate 106 is attached to the baseplate 104 by the hinge 108. Screws 120, 122, 124, 126 are provided to maintain this attachment. The heads of the screws 120, 122, 124, 126 are preferably oriented inwardly with regard to the base- and coverplates 104, 106 to preclude tampering therewith. As the connector receptacles of the fixture 102 are typically recessed therein, a cavity between the coverplate 106 and baseplate 104 is not required. Thus, the coverplate 106 preferably fits substantially flush against the portion of the baseplate 104 overlying the top portion of the fixture 102. The lock loop 116, provided similarly as for device 10, is positioned to extend through the opening 110 and, thereby, provide an attachment point for a locking device when the coverplate 106 is provided in its closed position. Finally, the coverplate 106 further includes full 112 and partial 114, 115 side portions. The full side portion 112 is preferably provided to cover the side connector receptacle exposure opening 138 of the baseplate 104 and formed by bending an appropriate margin portion of the coverplate 106 into position. The partial side portions are similarly provided to cover the edges of the baseplate 104 associated with and near the side of the fixture 102. This is preferably done to prevent tampering with the device at these edges. Naturally, these partial side portions 114, 115 can be extended along the coverplate edge as needed to afford the desired degree of protection.

Thus, a number of specific embodiments of a telephone jack security device, characterized by sliding, self-locking attachment or relatively more permanent attachment utilizing the standardly present screws of the fixtures, both in a manner that does not damage the fixture in any way, and a design that is resistant to and a deterrent of tampering, have been described.

It should be understood, of course, that the foregoing disclosure relates only to the preferred embodiments of the present invention and that numerous modifications in the design and substitutions for the preferred materials may be made without departing from the nature and scope of the present invention. It is therefore to be understood that, within the scope of the appended claims, the present invention may be practiced otherwise than as specifically described.

We claim:

1. A telephone access jack security device for limiting the connection of a telephonic device to an access jack, wherein said access jack is mounted in a fixture having an electrical connector receptacle, a faceplate or the like having attachment studs extending outwardly therefrom and including means for attaching said faceplate to said fixture, said security device comprising:
   (a) A baseplate adpated to mount on the front of said faceplate and including an opening therein so as to otherwise expose said connector receptacle and having slots positioned so as to correspond to said attachment studs of said faceplate, and at least one hold associated with a corresponding one of said slots so as to permit the insertion of a corresponding one of said studs therethrough;
   (b) A locking member attached to said baseplate and extending outwardly therefrom;
   (c) A coverplate of substantially unitary construction and of suitable dimensions to substantially cover said baseplate when placed in a parallel, overlying relationship therewith, said coverplate having sides so as to permit the formation of a cavity between said baseplate and said coverplate when placed in a parallel, overlying relationship sufficiently sealed to prevent passage of a connector suitable for insertion into said connector receptacle, said coverplate having an opening therein sufficient to permit the close passage of said locking member therethrough when said coverplate and said baseplate are placed in the parallel, overlying relationship with one another; and
   (d) Means for hingedly attaching said coverplate to said baseplate so as to permit said coverplate to be placed in a substantially parallel, overlying relationship with said baseplate, the connection points of said hinge means to said coverplate and said baseplate being such as to be substantially within the cavity formed between said coverplate and said baseplate so as to effectively preclude tampering therein.

2. The security device of claim 1 further comprises a blocking member attached to said coverplate and extending therefrom so as to substantially block said slot associated with said hole by extending into said hole when said coverplate is placed in a parallel, overlying relationship with said baseplate.

3. The security device of claim 2 wherein said blocking member is a substantially cylindrical shaft attached to said coverplate such that its cylindrical axis is substantially perpendicular to said coverplate, said shaft having a diameter slightly less than that of said hole.

* * * * *